United States Patent [19]

Anvari et al.

[11] Patent Number: 5,157,697
[45] Date of Patent: Oct. 20, 1992

[54] RECEIVER EMPLOYING CORRELATION TECHNIQUE FOR CANCELING CROSS-TALK BETWEEN IN-PHASE AND QUADRATURE CHANNELS PRIOR TO DECODING

[75] Inventors: Kiomars Anvari; Glyn Roberts, both of Calgary, Canada

[73] Assignee: NovAtel Communications, Ltd., Calgary, Canada

[21] Appl. No.: 672,847

[22] Filed: Mar. 21, 1991

[51] Int. Cl.⁵ ............................................. H04B 1/10
[52] U.S. Cl. ...................................... 375/102; 455/295
[58] Field of Search ................ 375/11, 15, 39, 99, 375/100, 101, 102; 328/165; 455/295, 296

[56] References Cited

U.S. PATENT DOCUMENTS

| | | | |
|---|---|---|---|
| 3,662,117 | 5/1972 | Bhatt et al. | 340/166 |
| 3,735,266 | 5/1973 | Amitay | 328/166 |
| 3,786,193 | 1/1974 | Tsurushima | 381/22 |
| 3,947,645 | 3/1976 | Mizukami et al. | 330/85 |
| 4,053,716 | 10/1977 | Enomoto | 379/417 |
| 4,060,696 | 11/1977 | Iwahara et al. | 381/19 |
| 4,118,599 | 10/1978 | Iwahara et al. | 381/1 |
| 4,119,798 | 10/1978 | Iwahara et al. | 381/19 |
| 4,139,738 | 2/1979 | Ienaka et al. | 330/85 |
| 4,159,397 | 6/1979 | Iwahara et al. | 381/19 |
| 4,192,969 | 3/1980 | Iwahara | 381/1 |
| 4,199,658 | 4/1980 | Iwahara | 381/24 |
| 4,204,091 | 5/1980 | Ishigaki et al. | 381/21 |
| 4,211,978 | 7/1980 | Takahashi | 455/295 |
| 4,220,923 | 9/1980 | Pelchat et al. | 455/295 |
| 4,239,937 | 12/1980 | Kampmann | 381/28 |
| 4,264,908 | 4/1981 | Pelchat et al. | 343/100 PE |
| 4,264,919 | 4/1981 | Abbott | 358/16 |
| 4,306,307 | 12/1981 | Levy et al. | 375/15 |
| 4,308,550 | 12/1981 | Melwisch et al. | 358/8 |
| 4,374,432 | 2/1983 | Kenner et al. | 365/209 |
| 4,390,746 | 6/1983 | Higashiyama et al. | 381/7 |
| 4,479,258 | 10/1984 | Namili | 455/295 |
| 4,484,234 | 11/1984 | Kimura | 358/340 |
| 4,484,336 | 11/1984 | Catchpole et al. | 375/4 |
| 4,495,528 | 1/1985 | Sasamura et al. | 360/40 |
| 4,542,425 | 9/1985 | de Niet | 360/77 |
| 4,554,595 | 11/1985 | Tanaka et al. | 358/328 |
| 4,571,639 | 2/1986 | Nagashima | 358/314 |
| 4,575,862 | 3/1986 | Tahara et al. | 455/296 |
| 4,577,330 | 3/1986 | Kavehrad | 375/102 |
| 4,602,227 | 7/1986 | Clark | 333/109 |
| 4,610,010 | 9/1986 | Claesen et al. | 370/32 |
| 4,649,505 | 3/1987 | Zinster, Jr. et al. | 379/411 |
| 4,661,842 | 4/1987 | Ishige et al. | 358/36 |
| 4,695,972 | 9/1987 | McKeowa | 364/819 |
| 4,715,064 | 12/1987 | Claessen | 379/392 |
| 4,893,342 | 1/1990 | Cooper et al. | 381/26 |
| 4,910,779 | 3/1990 | Cooper et al. | 318/26 |
| 5,075,697 | 12/1991 | Koizumi et al. | 455/295 |

OTHER PUBLICATIONS

AT&T Technical Journal, vol. 64, No. 10, Dec., 1985, pp. 2247-2259.

The Art of Electronics, Horowitz et al., 2nd edition, 1989, "High Frequency and High-Speed Techniques", pp. 895-897.

AT&T Technical Journal, vol. 64, No. 10, Dec., 1985, "Cross-Polarization Interface Cancellation and Nonminimum Phase Fades".

Primary Examiner—Stephen Chin
Attorney, Agent, or Firm—Cesari and McKenna

[57] ABSTRACT

A receiver suitable for use in a radio-telephone system for recovering data from encoded, quadrature-modulated communication signals employs a feedback arrangement for suppressing cross-talk between the receiver's in-phase and quadrature channels to improve data recovery rates during decoding. The receiver converts in-coming analog communication signals into in-phase and quadrature digital signals, which may have cross-talk components. The receiver has an attenuator for subtracting feedback signals from the in-phase and quadrature digital signals to produce cross-talk-attenuated in-phase and quadrature digital signals, a decoder for decoding the cross-talk-attenuated in-phase and quadrature digital signals to generate first and second data output signals, and the above-mentioned feedback arrangement, which preferably employs a recoder and cross-correlation techniques, for generating the feedback signals.

14 Claims, 2 Drawing Sheets

RECEIVER EMPLOYING CORRELATION TECHNIQUE FOR CANCELING CROSS-TALK BETWEEN IN-PHASE AND QUADRATURE CHANNELS PRIOR TO DECODING

FIELD OF THE INVENTION

The invention relates to telecommunication, and more particularly to techniques suitable for use in digital radio-telephone and other data communication applications for optimizing data recovery from quadrature-modulated communication signals.

BACKGROUND OF THE INVENTION

Advances in cellular radio-telephony have led to a hybrid analog/digital radio-telephone. A transmitter of such a telephone converts digital signals containing control and message information into analog signals for communication. More specifically, the transmitter forms transmission signals by modulating analog carriers with encoded versions of the digital signals. A common encoding scheme is phase-shift keying in which the digital signals are differentially encoded as changes in phase in accordance with an encoding algorithm.

A known modulation technique is quadrature modulation, which entails modulating two orthogonally-related sub-carriers (i.e., two analog signals that are 90 degrees apart in phase) with the encoded data. Typically, in quadrature modulation, the digital signals are converted into two parallel bit streams, and encoded as described above. Then, one of the encoded bit streams modulates a first of the sub-carriers, and the other encoded bit stream modulates a second of the sub-carriers. Subsequently, the modulated sub-carriers are added for transmission. The modulated sub-carriers are called the transmit in-phase ("I") signal, and the transmit quadrature ("Q") signals.

For recovery of digital data from received encoded, quadrature-modulated signals, a radio-telephone receiver employs a quadrature demodulator. For instance, the quadrature demodulator has a pair of mixers, each of which multiplies the received signal with one of two, different signals generated by a local oscillator and having orthogonally related phases, thereby producing baseband signals. The baseband signals are subsequently converted into digital signals and processed (e.g., filtered) along separate circuit paths, called respectively the "I" and "Q" channels.

The resulting signals, i.e., the RECEIVE_I and RECEIVE_Q signals, are then decoded to data in a decoder using, essentially, the reverse of the encoding algorithm. Ideally, RECEIVE_I and RECEIVE_Q are identical to the corresponding encoded bit streams produced by the encoders in the transmitter, in which case the receiver can recover the data accurately. In other words, the receiver can exhibit a "data recovery rate" of 100%. The data recovery rate is the number of correctly identified or recovered bits in a digital signal of preselected length divided by the total number of bits in that signal.

While such a receiver appears generally suitable for its intended purposes, its data recovery accuracy will depend on the extent to which the RECEIVE_I and RECEIVE_Q signals as supplied to the decoder are corrupted due to phase and/or amplitude distortion. Distortion in these signals can result in data errors: the more extensive the distortion, the lower the data recovery rate.

The distortion causes components of the RECEIVE_I signal to appear in the RECEIVE_Q signal, and components of the RECEIVE_Q signal appearing in the RECEIVE_I signal. These cross-over components are called "cross-talk." Unfortunately, decoding of signals corrupted with cross-talk can, and often will, result in data recovery errors, and performance degradation ultimately in the receiver.

Cross-talk-producing distortion can originate, for example, either during transmission or within the receiver itself. In cellular radio-telephony, for instance, transmission-originated distortion is a propagation effect arising while the communication signal is traversing the air-waves, e.g., due to multi-path fading.

Receiver-originated distortion is caused typically by various combinations of contributing factors, many of which are inherent in electronic devices and signal processing, and often are not readily controllable. For instance, potential sources of such distortion are receiver components having non-linear transfer functions (e.g., amplifiers, mixers, and limiters), signal-synchronization errors, impedance mismatch, filter-center-frequency offsets, electronic-device bandwidth tolerances, and oscillator-frequency drift.

SUMMARY OF THE INVENTION

Briefly, the invention resides in a feedback arrangement of a receiver, by means of which cross-talk between the receiver's in-phase and quadrature channels is canceled or, at least, substantially suppressed or attenuated. In so doing, the receiver in accordance with the invention can largely avoid the undesirable affects that cross-talk can have on decoding, and thereby can achieve optimal data recovery rates.

The receiver has an analog-to-digital converter for converting an in-coming encoded, quadrature-modulator, analog communication signal into in-phase and quadrature digital signals, each of which may have cross-talk components. The receiver also has an attenuator for subtracting feedback signals from the in-phase and quadrature digital signals to produce cross-talk-attenuated in-phase and quadrature digital signals, a decoder for decoding the cross-talk-attenuated in-phase and quadrature digital signals to generate first and second data output signals, and the above-mentioned feedback arrangement, which preferably employs a recoder for generating a reference signal, and cross-correlation techniques, for generating the feedback signals.

The invention is applicable to receivers of radio-telephones as well as of computer and other data communication systems. The invention will find particular utility, however, in cellular radio-telephones.

BRIEF DESCRIPTION OF THE DRAWINGS

The aforementioned aspects, features and advantages of the invention, as well as others, are explained in the following description taken in connection with the accompanying drawings, wherein.

DESCRIPTION OF PREFERRED EMBODIMENT

Figure 1:
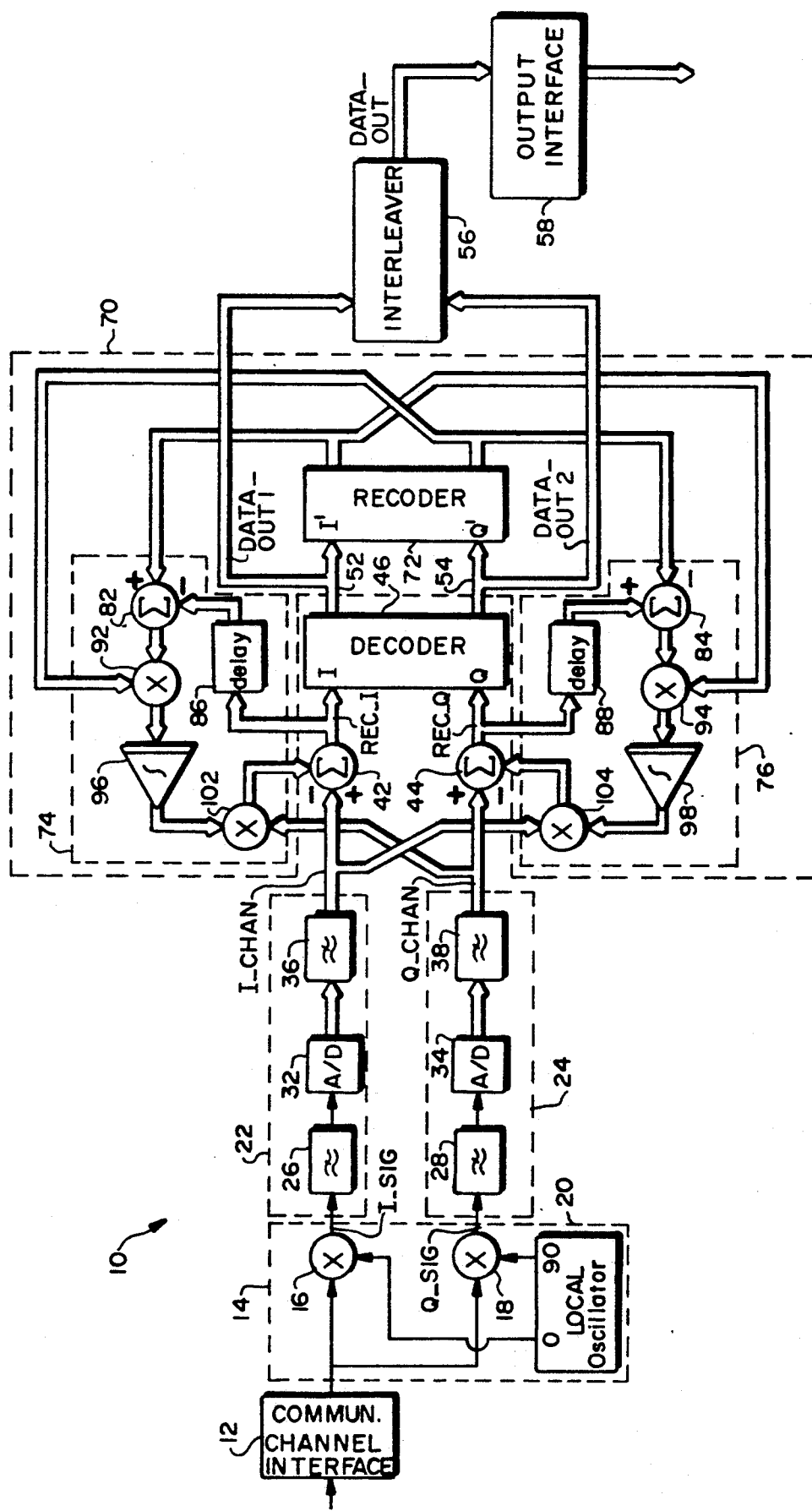
FIG. 1 is a block diagram of a receiver of an analog/digital communication system in accordance with a preferred embodiment of the invention.

FIG. 1 shows a digital receiver 10, which receives communication signals through a communication channel interface 12. For radio telephony, the communication channel interface 12 includes an antenna and often, an amplifier and front-end mixer for producing an intermediate frequency signal. In a computer telecommunication system, the communication channel interface 12 typically includes a port for connection to a communication cable and, often, an amplifier. The separate components making up the communication channel interface 12 are not shown in the drawing.

A conventional frequency down-conversion arrangement 14 converts the output of the communication channel interface 12 into two, orthogonally-related signals, sometimes called "in-phase and quadrature baseband signals." The frequency down-conversion arrangement 14 includes first and second mixers 16, 18, and a local oscillator 20. The local oscillator 20 produces first and second analog signals that differ in phase by 90 degrees.

The first mixer 16 mixes the communication channel interface output with the first analog signal from the local oscillator 20 to produce one of the baseband signals, which is then applied to an I-channel 22, and, for that reason, is called I_SIG. Analogously, the second mixer 18 mixes the communication channel interface output with the second analog signal from the local oscillator 20 to produce the other baseband signal, which is then applied to a Q-channel 24 and is called Q_SIG.

I_SIG and Q_SIG are processed in the respective I- and Q- channels 22 and 24 by low-pass filters 26, 28, analog-to-digital ("A/D") converters 32, 34, and digital filters 36, 38. The low-pass filters 26, 28 typically perform anti-aliasing, and produce band-limited signals for sampling by the A/D converters 32, 34. The digital filters 36, 38 filter the digitized signals from the A/D converters 32, 34 in order to achieve, e.g., adjacent-channel rejection. The output signals from the digital filters 36, 38 are I_CHAN and Q_CHAN, respectively.

I_CHAN and Q_CHAN are applied to respective attenuators 42, 44, which subtract feedback signals therefrom to cancel (or, at least, largely suppress) cross-talk in those signals, and thereby yield substantially uncorrupted RECEIVE_I and RECEIVE_Q signals. The generation of the feedback signals will be described in detail below.

A conventional decoder 46 is coupled to the attenuators 42, 44 to decode RECEIVE_I and RECEIVE_Q, and produce output signals DATA_OUT1 and DATA_OUT2. The decoder 46 can generally accurately decode these signals, even in the presence of low-level interference, since the decoder 46 preferably makes decoding decisions through a phase-mapping process which is impervious to such noise. However, when RECEIVE_I and RECEIVE_O are corrupted with cross-talk, the phase-mapping process in the decoder 46 can produce bit errors in DATA_OUT1, DATA_OUT2.

The decoder 46 applies DATA_OUT1, DATA_OUT2, to respective output lines 52, 54. DATA_OUT1, DATA_OUT2 are subsequently processed, e.g., interleaved in an interleaver 56 to generate a single, output data signal, DATA_OUT.

An output interface 58 connects the receiver 10 to a device (not shown), which is to receive DATA_OUT. In a radio-telephone system the output interface 58 includes, for example, a voice decoder (i.e., a "vocoder") and is connected to a speaker. In a computer telecommunication system, the output interface can be connected directly to a computer terminal. The separate components of the output interface 58 are not shown in the drawing.

Mathematical Description of Cross-talk

Before continuing on with a description of an arrangement for generating the feedback signals, we will now provide a brief mathematical description of the signals processed in the receiver 10 in order to convey a better understanding of the nature of cross-talk, and the advantages of suppressing cross-talk in accordance with the invention.

Referring still to FIG. 1, the signal applied to the mixers 16, 18 can be expressed in complex mathematical notation as:

$$y(t) = \Sigma(a_n + jb_n) \, h(t-\tau) \, \text{EXP}\{j[2 f_c t + \theta_f]\} \quad \text{EQ (1)}$$

where "$a_n$" and "$b_n$" are the data sequences in the in-phase and quadrature channels, respectively; "t" is time; "$\tau$" is the symbol period; "h" is the pulse response of the channel up to the mixers 16, 18; "$f_c$" is the carrier frequency; "$\theta_f$" is the carrier phase; and "j" is the square root of ($-1$), thus denoting an imaginary number.

The local oscillator outputs Z(t), jZ(t) are given by Equations (2) and (3), respectively. (The fact that signals Z(t) and jZ(t) are 90 degrees out of phase with one another is represented mathematically by the coefficient, "j").

$$Z(t) = \text{EXP}\,[-j(2 f t + \theta_{II})] \quad \text{EQ (2)}$$

$$jZ(t) = j\text{EXP}\,[-j(2 f t + \theta_{II})] \quad \text{EQ (3)}$$

where "f" is the local oscillator frequency, and "$\theta_{II}$" is the local oscillator phase.

Mixers 16, 18 mix y(t) with both Z(t) and jZ(t) to yield, respectively, I_SIG and Q_SIG, the baseband signals, which are given in Equations (4) and (5).

$$\text{I\_SIG} = \Sigma(a_n + jb_n) \, h_1(t-\tau) \quad \text{EQ (4)}$$

$$\text{Q\_SIG} = j\Sigma(a_n + jb_n) \, h_1(t-\tau) \quad \text{EQ (5)}$$

where $h_1$ is the pulse response of the channel through to, and including, the mixers 16, 18.

As can be seen, I_SIG includes a factor containing "$b_n$", which is the data sequence belonging in the Q-channel; and vice versa, Q_SIG includes a factor containing "$a_n$", which is the data sequence belonging in the I-channel. These cross-over terms, i.e., $b_n$ in I-SIG and $a_n$ in Q-SIG, are cross-talk.

This will come further into focus by considering the following: If the pulse response of the channel through to and including the mixers 16, 18 were equal to a real function, e.g., "x," then Equations (4) and (5) would simplify to $\Sigma[a_n(x)]$ and $\Sigma[-b_n(x)]$, respectively. Notice that these terms do not include any cross-talk.

On the other hand, if $h_1$ is a complex number represented by "$x+jy$", then, after substituting, Equations 4 and 5 can be rewritten as Equations 6 and 7.

$$\text{I\_SIG} = \Sigma(a_n + jb_n)(x + jy)$$
EQ (6)

$$Q\_SIG = j\Sigma(a_n + jb_n)(x + jy) \quad \text{EQ (7)}$$

The real components of these equations is of a special interest. The real component of Equation (6) is given by Equation (8), and the real component of Equation (7) is given by Equation (9).

$$Re\ (I\_SIG) = \Sigma(a_n x - b_n y) \quad \text{EQ (8)}$$

$$Re\ (Q\_SIG) = \Sigma(b_n x - a_n y) \quad \text{EQ (9)}$$

From a practical standpoint, it is the cross-over terms in these real components of I_SIG and Q_SIG as given in Equations (8) and (9) that represent detectable cross-talk at the outputs of the mixers 16, 18.

Since, as explained above, it would be desirable to cancel the cross-talk from the signals supplied to the decoder 46 in order to optimize the data recovery rate, a feedback arrangement employing a correlation technique for substantially canceling cross-talk will now be described.

Feedback Arrangement

In accordance with the invention, a feedback-signals-generation sub-circuit 70 generates the feedback signals that the attenuators 42, 44 use to substantially cancel cross-talk in I_CHAN and Q_CHAN, respectively. The feedback-signals-generation sub-circuit 70 has a recoder 72, and cross-talk equalizers 74, 76.

The recoder 72 is coupled to the decoder 46 to reencode DATA_OUT1 and DATA_OUT2 using essentially the identical encoding algorithm to that used in the transmitter (not shown) for encoding the data prior to transmission. The regenerated encoded output signals from the recoder 72 are called I_RECODE and Q_RECODE. I_RECODE and Q_RECODE are essentially free of any transmission-originated and receiver-originated distortion, unlike RECEIVE_I and RECEIVE_Q. These output signals are applied to an I-signal path and a Q-signal path containing the respective I-path cross-talk equalizer 74, and Q-path cross-talk equalizer 76.

Each of the cross-talk equalizers 74, 76 has an attenuator 82, 84, a delay 86, 88, first multipliers 92, 94, integrators 96, 98, and second multipliers 102, 104.

The I-path attenuator 82 subtracts I_RECODE from a delayed version of RECEIVE_I (which is also provided to the decoder 46 as described above). The delay in the supplied RECEIVE_I is introduced by the delay element 86 and is essentially equal to the inherent delay introduced into I_RECODE (with respect to RECEIVE_I) by its signal path including the decoder 46 and the recoder 72.

Analogously, the Q-path attenuator 84 subtracts Q_RECODE from a delayed version of the RECEIVE_Q signal (which is also provided to the decoder 46 as described above). The delay in the supplied RECEIVE_Q is introduced by the delay element 88 and is essentially equal to the inherent delay introduced into Q_RECODE (with respect to RECEIVE_Q) by its signal path including the decoder 46 and the recoder 72.

The first multipliers 92, 94 and integrators 96, 98 together perform cross-correlation functions. The I-path first multiplier 92 multiplies the output of attenuator 82 by Q_RECODE, and the Q-signal path first multiplier 94 multiplies the output of attenuator 84 by I_RECODE. The output signals from the first multipliers 92, 94 can be considered "error signals," which are integrated, i.e., time averaged, in the integrators 96, 98, respectively, to generate cross-correlation factors $G_{IQ}$, $G_{QI}$.

Where RECEIVE_I and RECEIVE_Q have essentially no cross-talk, the input signals to the first multipliers 92, 94 have negligible correlation. On the other hand, where substantial cross-talk is present, the correlation will be higher. The correlation factors $G_{IQ}$, $G_{QI}$ represent the extent of correlation in RECEIVE_I and RECEIVE_Q. Essentially, therefore, the correlation factors $G_{IQ}$, $G_{QI}$ are an indication of the amount of correlated quadrature components in RECEIVE_I and RECEIVE_Q. Consequently, the first multipliers 92, 94 and their associated integrators 96, 98 can be regarded as cross-talk correlators.

The second multipliers 102, 104 multiply the cross-correlation factors $G_{IQ}$, $G_{QI}$ by the respective I-signal and Q-signal outputs of the digital filters 36, 38 to produce the I-path and Q-path feedback signals that are applied to attenuators 42, 44, as described above.

Accordingly, the cross-talk equalizers 74, 76 cause the attenuators 42, 44 to substantially cancel cross-talk (or, at least, reduce cross-talk to acceptable limits) by subtracting from I_CHAN and Q_CHAN a portion of the orthogonal components of Q_CHAN and I_CHAN, respectively. The portions that are subtracted are controlled by the cross-correlation factors $G_{IQ}$, $G_{QI}$ via second multipliers 102, 104. Thus, the invention employs a feedback loop to suppress cross-talk between the I and Q channels 22 24 and thereby improve the data recovery rate.

Figure 2:
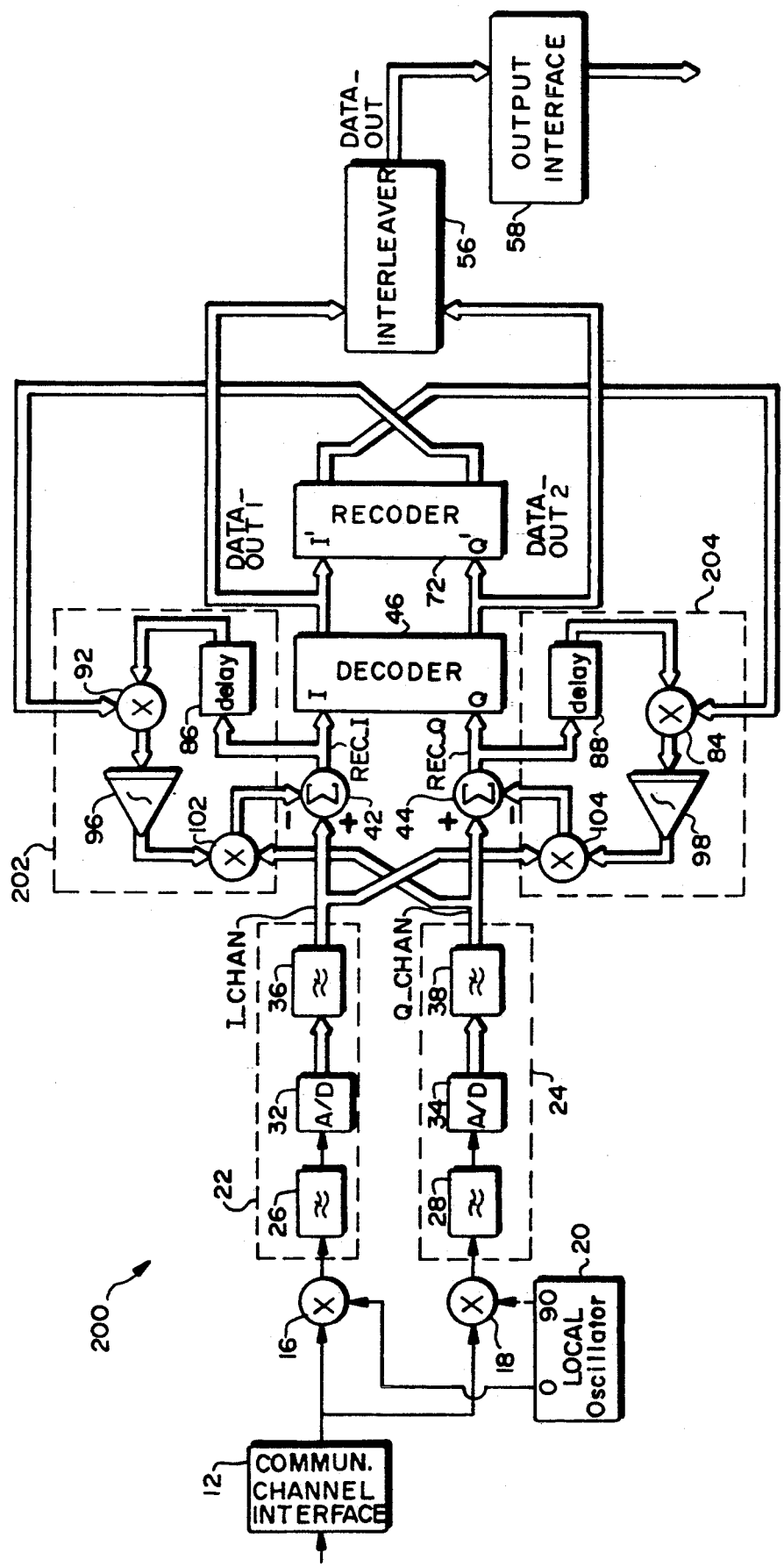
FIG. 2 is a block diagram of a receiver for an analog/digital communication system in accordance with an alternative embodiment of the invention.

FIG. 2 shows a receiver 200 in accordance with an alternative embodiment of the invention. For convenience, the illustrated components of receiver 200 bear the same reference numbers as their counterparts in FIG. 1, and perform the same functions, except for the cross-talk equalizers 202, 204.

The essential difference between cross-talk equalizers 74, 76 of FIG. 1 and cross-talk equalizers 202, 204 of FIG. 2, is that the latter does not employ attenuators 82, 84 (FIG. 1). The delayed RECEIVE_I and RECEIVE_Q signals from delays 86, 88 are instead applied directly to multipliers 92, 94, where they are multiplied by Q_RECODE and I_RECODE, respectively, and then the products are integrated as in the earlier embodiment.

Accordingly, cross-talk equalizers 202, 204 of FIG. 2 form the cross-correlation factors by integrating the products of a delayed version of RECEIVE_I and Q_RECODE and of a delayed version of RECEIVE_Q and I_RECODE, respectively. In contrast, the cross-talk equalizers 74, 76 of FIG. 1 form the cross-correlation factors by integrating the products of Q_RECODE and the difference between I_RECODE and a delayed version of RECEIVE_I, and of I_RECODE and the difference between Q_RECODE and a delayed version of RECEIVE_Q, respectively. It can be expected that the products produced in cross-talk equalizers 74, 76 will typically be smaller than those produced in cross-talk equalizers 202, 204.

Therefore, in many applications, cross-talk equalizers 202, 204 will require longer time constants for performing integrations than that required by cross-talk equalizers 202, 204. However, receiver 200 will find potential applications where less cross-talk is typically present, or where timing constraints are less stringent.

The foregoing description has been limited to specific embodiments of this invention. It will be apparent, however, that variations and modifications may be made to the invention, while continuing to attain some or all of its advantages. Therefore, it is the object of the appended claims to cover all such variations and modifications as come within the true spirit and scope of the invention.

What is claimed is new and desired to be secured by Letters Patent is:

1. A receiver comprising:
   A) an analog-to-digital converter for converting an encoded, quadrature-modulated, analog communication signal into in-phase and quadrature digital signals having cross-talk components;
   B) an attenuator coupled to said analog-to-digital converter for subtracting a first feedback signal from said in-phase digital signal to produce a cross-talk-attenuated in-phase digital signals, and for subtracting a second feedback signal from said quadrature digital signal to produce a cross-talk-attenuated quadrature digital signal;
   C) a decoder coupled to said attenuator for decoding said cross-talk-attenuated in-phase and quadrature digital signals to generate respective first and second data output signals; and
   D) a feedback arrangement including a recoder coupled to said decoder for producing first and second recoded signals from said respective first and second data output signals, and feedback-signal-generating means coupled to said analog-to digital converter, said attenuator, and said recoder, for generating said feedback signals in response to said in-phase and quadrature digital signals, said cross-talk-attenuated in-phase and quadrature digital signals, and said first and second recoded signals.

2. The receiver in accordance with claim 1, wherein said feedback-signal-generating means has means for producing a first correlation signal indicative of the extent of correlation between the cross-talk-attenuated in-phase digital signal and the first recoded signal, and a second correlation signal indicative of the extent of correlation between the cross-talk-attenuated quadrature digital signal and the second recoded signal, and means responsive to said first and second correlation signals for producing said feedback signals.

3. The receiver in accordance with claim 1, wherein said feedback arrangement includes:
   A) means for integrating the product of said second recoded signal and the difference between said first recoded signal and a delayed version of said cross-talk-attenuated in-phase digital signal, and of said first recoded signal and the difference between said second recoded signal and a delayed version of said cross-talk-attenuated quadrature digital signal, to produce first and second correlation factors, respectively; and
   B) means for combining said in-phase digital signal and said first correlation factor to produce said first feedback signal, and for combining said quadrature digital signal and said second correlation factor to produce said second feedback signal.

4. The receiver in accordance with claim 1, wherein said feedback arrangement includes:
   A) means for integrating the product of said second recoded signal and a delayed version of said cross-talk-attenuated in-phase digital signal, and of said first recoded signal and said cross-attenuated quadrature digital signal, to produce first and second correlation factors, respectively; and
   B) means for combining said in-phase digital signal and said first correlation factor to produce said first feedback signal, and for combining said quadrature digital signal and said second correlation factor to produce said second feedback signal.

5. A receiver for recovering data from encoded, quadrature-modulated communication signals, comprising:
   A) supplying means for supplying in-phase and quadrature digital signals each having cross-talk components;
   B) first attenuating means coupled to said supplying means for attenuating said cross-talk components of said in-phase and quadrature digital signals by subtracting first and second cross-talk-attenuating feedback signals from said in-phase and quadrature digital signals to produce a cross-talk-attenuated in-phase and quadrature digital signals, respectively;
   C) decoding means for decoding said cross-talk-attenuated in-phase and quadrature digital signals to generate respective first and second data output signals, and for applying said first and second data output signals to at least one output line; and
   D) feedback means coupled to said attenuating means and said decoding means for generating said cross-talk-attenuating feedback signals; and
   E) wherein said feedback means includes
      1) recoding means coupled to said decoding means for re-encoding said first and second data output signals to produce first and second recoded signals; and
      2) feedback-signal-generating means coupled to said supplying means, decoding means and recoding means and responsive to said in-phase and quadrature digital signals, said cross-talk-attenuating in-phase and quadrature digital signals, and said first and second recoded signals, for generating said cross-talk-attenuating feedback signals.

6. The receiver in accordance with claim 5, wherein said feedback-signal-generating means includes
   A) correlation means coupled to said first attenuating means and said recoder means for generating first and second correlation factors in response to said cross-talk-attenuated in-phase and quadrature digital signals and said first and second recoded signals; and
   B) first means coupled to said supplying means, said correlation means, and said first attenuating means for combining said in-phase and quadrature digital signals with said first and second correlation factors to produce said cross-talk-attenuating feedback signal.

7. The receiver in accordance with claim 6, wherein said correlation means includes multiplier means coupled to said first attenuating means and said recoder means for multiplying delayed versions of said cross-talk-attenuated in-phase and quadrature digital signals respectively by said second and first recoded signals to produce respective first and second products; and integrating means for integrating said first and second products over time to produce said first and second cross-talk factors, respectively.

8. The receiver in accordance with claim 5, wherein said feedback-signal generating means includes A) second attenuating means coupled to said first attenuating means and said recoder means for subtracting said first and second recoded signals from delayed versions of said cross-talk-attenuated in-phase and quadrature digital signals to produce first and second difference signals, respectively;

B) correlation means coupled to said second attenuating means and said recoder means for generating first and second correlation factors in response to respective first and second difference signals and first and second recoded signals; and C) first means coupled to said supplying means, said correlation means, and said attenuating means for combining said in-phase and quadrature digital signals with said first and second correlation factors to produce said first and second cross-talk attenuating feedback signal, respectively.

9. A receiver for recovering data from encoded, quadrature-modulated communication signals, comprising:

A) supplying means for supplying in-phase and quadrature digital signals each having cross-talk components;

B) attenuating means coupled to said supplying means for attenuating said cross-talk components of said in-phase and quadrature digital signals by subtracting an in-phase cross-talk-attenuating feedback signal rom said in-phase digital signal to produce a cross-talk-attenuated in-phase digital signal, and by subtracting a quadrature cross-talk-attenuating feedback signal from said quadrature digital signal to produce a cross-talk-attenuated quadrature digital signal;

C) decoding means for decoding said cross-talk-attenuated in-phase digital signals to generate an in-phase data output signal, for decoding said cross-talk-attenuated quadrature digital signal to generate a quadrature data output signal, and for applying said data output signals to at least one output line; and D) feedback means coupled to said attenuating means and said decoding means for generating said cross-talk-attenuating feedback signals, said feedback means including 1) recoding means coupled to said decoding means for re-encoding said in-phase data output signal to produce an in-phase recoded signals, and for re-encoding said quadrature data output signal to produce a quadrature recoded signal; and 2) feedback-signal-generating means coupled to said supplying means, decoding means and recoding means, for generating said in-phase cross-talk-attenuating feedback signal in response to said quadrature digital signal, said cross-talk-attenuated in-phase digital signal, and said quadrature recoded signal, and for generating said quadrature cross-talk-attenuating feedback signal in response to said in-phase digital signal, said cross-talk-attenuated quadrature digital signal, and said in-phase recoded signal.

10. The receiver in accordance with claim 9, wherein said feedback-signal-generating means includes A) correlation means coupled to said attenuating means and said recoder means for generating an in-phase correlation factor in response to a delayed version of said cross-talk-attenuated in-phase digital signal and said quadrature recoded signal, and for generating a quadrature correlation factor in response to a delayed version of said cross-talk-attenuated quadrature digital signal and aid in-phase recoded signals; and B) first means coupled to said supplying means, said correlation means, and said first attenuating means for combining said quadrature digital signal with said in-phase correlation factors to produce said in-phase cross-talk-attenuating feedback signal, and for combining said in-phase digital signal with said quadrature correlation factor to produce said quadrature cross-talk-attenuating feedback signal.

11. The receiver accordance with claim 9, wherein said correlation means includes A) multiplier means coupled to said first attenuating means and said recoder means for multiplying a delayed version of said cross-talk-attenuated in-phase digital signal by said quadrature recoded signal to produce an in-phase product signal, and for multiplying a delayed version of said cross-talk-attenuated quadrature digital signal by said in-phase recoded signal to produce a quadrature product signal; and B) integrating means for integrating said in-phase product signal over time to produce said in-phase correlation factor, and for integrating said quadrature product signal over time to produce said quadrature correlation factor.

12. The receiver in accordance with claim 9, wherein said feedback-signal-generating means includes A) second attenuating means coupled to said first attenuating means and said recoder means for subtracting said in-phase recoded signal from a delayed version of said cross-talk-attenuated in-phase digital signal to produce an in-phase difference signal, and for subtracting said quadrature recoded signal from a delayed version of said cross-talk-attenuated quadrature digital signal to produce a quadrature difference signal;

B) correlation means coupled to said second attenuating means and said recoder means for generating an in-phase correlation factor in response to said in-phase difference signal and said quadrature recoded signal, and for generating a quadrature correlation factor in response to said quadrature difference signal and said in-phase recoded signal; and C) first means coupled to said supplying means, said correlation means, and said attenuating means for combining said quadrature digital signal with said in-phase correlation factors to produce said in-phase cross-talk attenuating feedback signal, and for combining said in-phase digital signal with said quadrature correlation factor to produce said quadrature cross-talk attenuating feedback signal.

13. A receiver for recovering data from encoded, quadrature-modulated communication signals, comprising:

A) frequency-converting means for providing baseband in-phase and quadrature analog signals;

B) means coupled to said frequency-converting means for converting said baseband in-phase and quadrature analog signals into corresponding in-phase and quadrature digital signals;

C) decoding means coupled to said converting means for decoding first and second cross-talk-attenuated in-phase and quadrature digital signals to generate corresponding first and second data output signals, and for applying said first and second data output signals to corresponding first and second output lines;

D) recoding means coupled to said decoding means for re-encoding said first and second data output signals to produce corresponding first and second recoded signals; and E) cross-talk equalizer means coupled to said converting means, decoding means and recoding means for attenuating cross-talk in said in-phase and quadrature digital signals, said cross-talk equalizer means comprising 1) cross-talk correlator means for generating first and second correlation factors indicative of the correlation of said in-phase and quadrature digital signals with respect to said second and first recoded signals, respectively;

2) means for combining said first and second correlation factors with said quadrature and in-phase digital signals to produce first and second feedback signals, respectively; and 3) attenuating means coupled to said converting means; combining means, and said decoding means, for subtracting said first and second feedback signals from said in-phase and quadrature digital signals to produce said cross-talk-attenuated in-phase and quadrature digital signals, respectively.

14. The receiver in accordance with claim 13, further comprising means for subtracting delayed versions of said in-phase and quadrature digital signals from said first and second recoded signals to produce first and second difference signals, and for applying said difference signal to said cross-talk correlator means; and wherein said cross-talk correlator means generates said first and second correlation factors in response to said first and second difference signals.

* * * * *